(12) United States Patent
Asada

(10) Patent No.: US 9,956,912 B2
(45) Date of Patent: May 1, 2018

(54) WORKING VEHICLE PERIPHERY MONITORING SYSTEM AND WORKING VEHICLE

(75) Inventor: Nao Asada, Yokohama (JP)

(73) Assignee: Komatsu Ltd., Tokyo (JP)

( * ) Notice: Subject to any disclaimer, the term of this patent is extended or adjusted under 35 U.S.C. 154(b) by 0 days. days.

(21) Appl. No.: 13/825,071

(22) PCT Filed: Sep. 13, 2012

(86) PCT No.: PCT/JP2012/073541
§ 371 (c)(1),
(2), (4) Date: May 13, 2014

(87) PCT Pub. No.: WO2013/118344
PCT Pub. Date: Aug. 15, 2013

(65) Prior Publication Data
US 2015/0138338 A1 May 21, 2015

(30) Foreign Application Priority Data
Feb. 9, 2012 (JP) .................................. 2012-026709

(51) Int. Cl.
*B60R 1/00* (2006.01)
*G06T 3/40* (2006.01)
(Continued)

(52) U.S. Cl.
CPC .............. *B60R 1/00* (2013.01); *G06T 3/4038* (2013.01); *H04N 5/23238* (2013.01);
(Continued)

(58) Field of Classification Search
CPC ....... B60R 1/00; H04N 7/181; H04N 5/23238
(Continued)

(56) References Cited

U.S. PATENT DOCUMENTS

2006/0115124 A1* 6/2006 Nobori ...................... B60R 1/00
382/104
2006/0290482 A1* 12/2006 Matsumoto .......... B60Q 1/2665
340/436
(Continued)

FOREIGN PATENT DOCUMENTS

| JP | 03-099952 A | 4/1991 |
| JP | 2008-283431 A | 11/2008 |
| JP | 2012-147308 A | 8/2012 |

OTHER PUBLICATIONS

Office Action dated Mar. 13, 2014, issued for the corresponding Australian Patent Application No. 2012370412.
(Continued)

*Primary Examiner* — Mehrdad Dastouri
*Assistant Examiner* — Rowina Cattungal
(74) *Attorney, Agent, or Firm* — Locke Lord LLP

(57) ABSTRACT

A working vehicle periphery monitoring system includes: a synthesis process unit that acquires image information output from a plurality of image capturing devices at a predetermined timing and synthesizes the acquired image information to generate synthesis image information; an updating information adding unit that adds updating information to the synthesis image information generated by the synthesis process unit; a synthesis image storage unit that stores the synthesis image information to which the updating information is added; and an updated state determining unit that acquires the synthesis image information to which the updating information IR is added from the synthesis image storage unit and detects that the synthesis image information is updated based on the updating information.

13 Claims, 8 Drawing Sheets

(51) Int. Cl.
    *H04N 5/232*    (2006.01)
    *H04N 5/247*    (2006.01)
    *H04N 7/18*     (2006.01)

(52) U.S. Cl.
    CPC ............. *H04N 5/247* (2013.01); *H04N 7/181* (2013.01); *B60R 2300/105* (2013.01); *B60R 2300/303* (2013.01); *B60R 2300/607* (2013.01); *B60R 2300/802* (2013.01); *B60R 2300/8086* (2013.01)

(58) Field of Classification Search
    USPC ....................................................... 348/148
    See application file for complete search history.

(56) References Cited

U.S. PATENT DOCUMENTS

2008/0170122 A1\* 7/2008 Hongo .................. G06T 7/0028
                                                        348/148
2011/0285982 A1   11/2011 Breed

OTHER PUBLICATIONS

International Search Report dated Nov. 20, 2012, issued for PCT/JP2012/073541.

\* cited by examiner

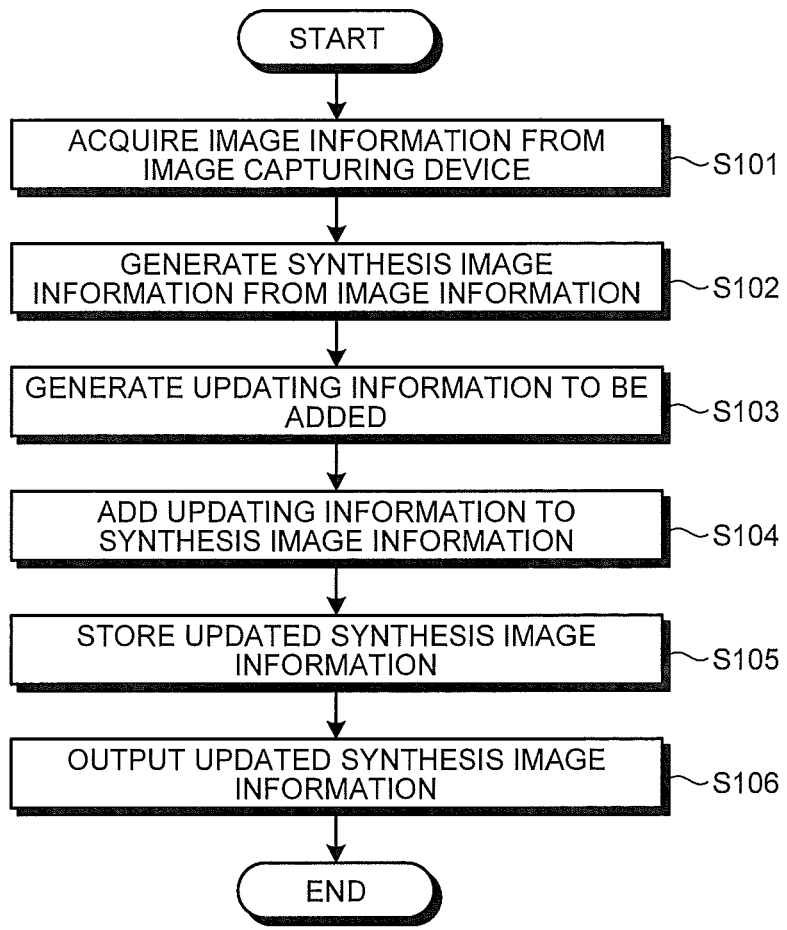
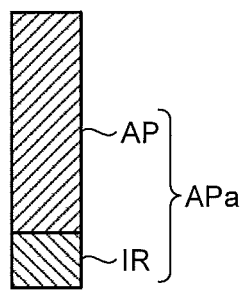

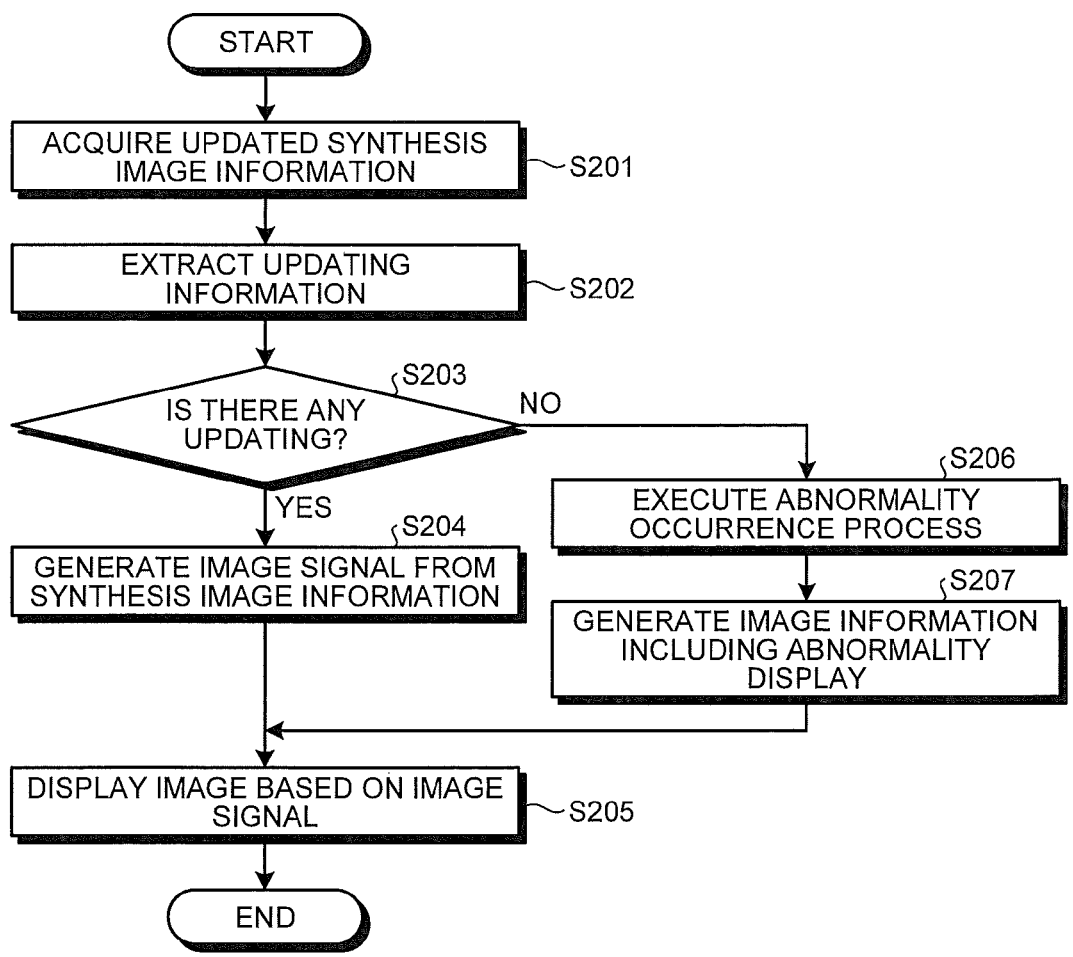

WORKING VEHICLE PERIPHERY MONITORING SYSTEM AND WORKING VEHICLE

FIELD

The present invention relates to a technique of monitoring a periphery of a working vehicle.

BACKGROUND

In a civil engineering work site or a quarry site of a mine, various working vehicles such as a dump truck and an excavator are operated. Particularly, a superjumbo working vehicle is used in a mine. Since such a working vehicle has a vehicle width and a vehicle length noticeably larger than those of a general vehicle, it is difficult for an operator to check and understand an environment in the periphery of the working vehicle by a side mirror and the like.

There is proposed a device which monitors a periphery of a vehicle as a technology for assisting a running operation by helping the driver or the operator to simply recognize the environment in the periphery of the vehicle. In such a periphery monitoring device, for example, the periphery of the vehicle is captured by a camera attached to the vehicle and the acquired images are synthesized so as to generate an overhead image showing the periphery of the vehicle (for example, see Patent Literature 1).

CITATION LIST

Patent Literature

Patent Literature: Japanese Laid-open Patent Publication No. 03-099952

SUMMARY

Technical Problem

The overhead image is used to assist the running operation of the operator while being displayed on an image display device mounted on the vehicle. When any problem occurs in an image processing device which generates the overhead image, there is a possibility that a correct overhead image may not be displayed on the image display device. In Patent Literature 1, the problem of the image processing device is not described, and hence there is a need to improve the technology.

The invention aims to detect a problem of an image processing device which synthesizes images when assisting a running operation by an image obtained by synthesizing images captured by a plurality of image capturing devices.

Solution to Problem

According to the present invention, a working vehicle periphery monitoring system comprises: a plurality of image capturing devices that are attached to a working vehicle and capture a periphery of the working vehicle to output image information; a synthesis process unit that acquires the image information output from the plurality of image capturing devices and synthesizes the acquired image information to generate synthesis image information; an updating information adding unit that adds updating information representing that the synthesis image information is newly generated by the synthesis process unit to the synthesis image information generated by the synthesis process unit; a synthesis image storage unit that stores the synthesis image information to which the updating information is added; an image display process unit that displays an image based on the synthesis image information stored in the synthesis image storage unit on an image display device; and an updated state determining unit that acquires the synthesis image information to which the updating information is added from the synthesis image storage unit and detects that the synthesis image information is updated based on the updating information.

In the present invention, it is preferable that the synthesis process unit synthesizes the acquired image information to generate the synthesis image information and outputs a synthesis process end signal to the updating information adding unit.

In the present invention, it is preferable that the updating information adding unit determines whether to add the updating information based on the synthesis process end signal.

In the present invention, it is preferable that the updated state determining unit notifies information representing an abnormality when the updated state determining unit does not detect that the synthesis image information is updated.

In the present invention, it is preferable that the updated state determining unit notifies the information representing the abnormality to the image display device.

In the present invention, it is preferable that the updated state determining unit stops the display of the image based on the synthesis image information stored in the synthesis image storage unit.

In the present invention, it is preferable that when the information representing the abnormality is notified, the display of the image on the image display device is stopped.

In the present invention, it is preferable that the updated state determining unit notifies the information representing the abnormality when the number of times in which the updating of the synthesis image information is not detected is equal to or larger than a predetermined number of times.

According to the present invention, a working vehicle periphery monitoring system comprises: a plurality of image capturing devices that are attached to a working vehicle and capture a periphery of the working vehicle to output image information; a synthesis process unit that acquires the image information output from the plurality of image capturing devices and synthesizes the acquired image information to generate synthesis image information; an updating information adding unit that adds updating information representing that the synthesis image information is newly generated by the synthesis process unit to the synthesis image information generated by the synthesis process unit; a synthesis image storage unit that stores the synthesis image information to which the updating information is added; an image display process unit that displays an image based on the synthesis image information stored in the synthesis image storage unit on an image display device; and an updated state determining unit that acquires the synthesis image information to which the updating information is added from the synthesis image storage unit, detects that the synthesis image information is updated based on the updating information, and notifies information representing an abnormality to the image display device when the updated state determining unit does not detect that the synthesis image information is updated, wherein the synthesis process unit synthesizes the acquired image information to generate the synthesis image information and outputs a synthesis process end signal to the updating information adding unit, and the updating information adding unit determines whether to add the updating information based on the synthesis process end signal.

According to the present invention, a working vehicle comprises the working vehicle periphery monitoring system.

According to the invention, it is possible to detect a problem of an image processing device which synthesizes images when assisting a running operation by an image obtained by synthesizing images captured by a plurality of image capturing devices.

BRIEF DESCRIPTION OF DRAWINGS

FIG. 6 is a flowchart illustrating a process sequence of an image synthesizing unit 22.

FIG. 7 is a conceptual diagram of updated synthesis image information APa.

FIG. 8 is a flowchart illustrating a process sequence of an image display unit 23.

DESCRIPTION OF EMBODIMENTS

Figure 1:
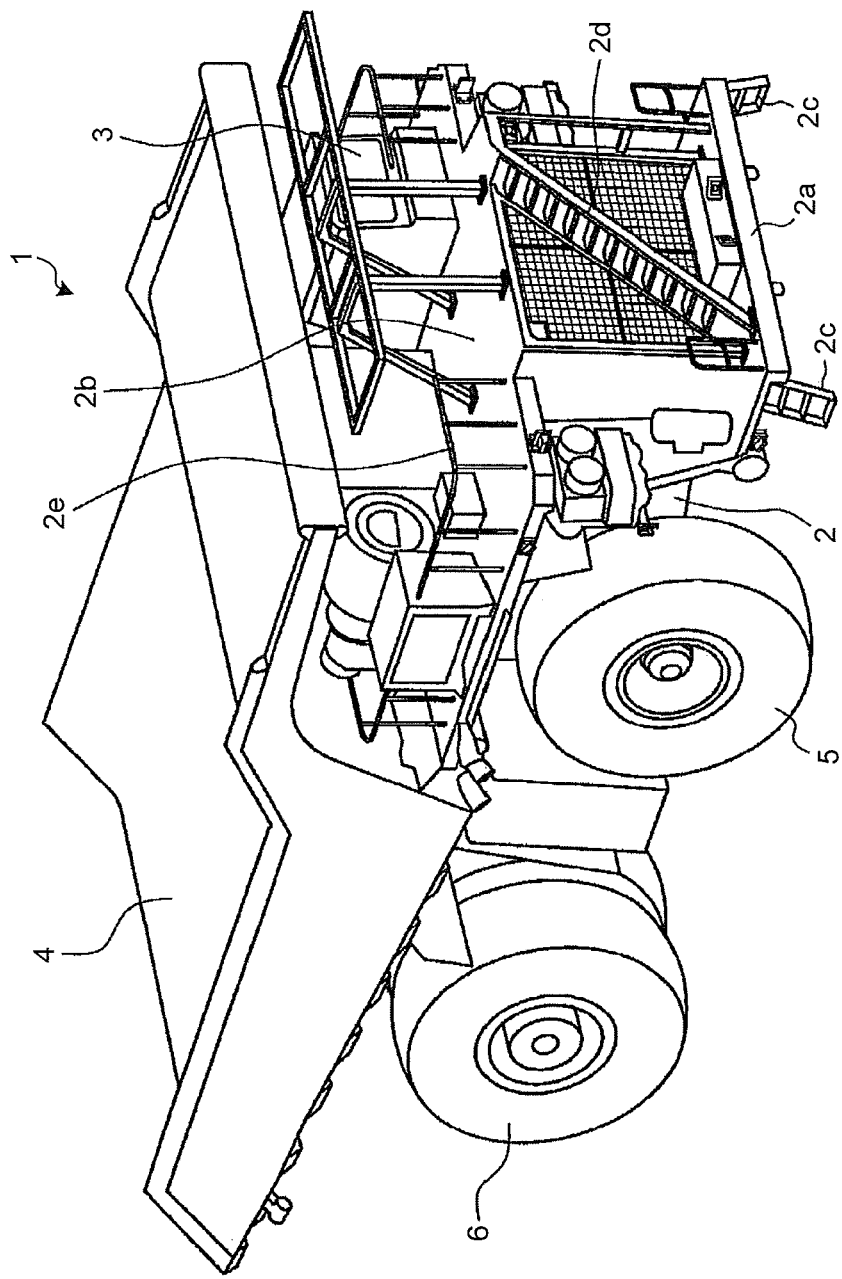
FIG. 1 is a perspective view illustrating a working vehicle 1 according to an embodiment.

A mode for carrying out the invention (embodiment) will be described in detail by referring to the drawings. The invention is not limited to the content described in the embodiment below. In the description below, the front side, the rear side, the left side, and the right side are terms based on an operator who sits on a driver seat. The vehicle width direction is identical to the left and right direction.

<Working Vehicle>

FIG. 1 is a perspective view illustrating a working vehicle 1 according to the embodiment. In the embodiment, the working vehicle 1 is a self-running type superjumbo dump truck which is used for an operation in a mine. The working vehicle 1 is not limited to the dump truck, and may be, for example, an excavator, a sprinkler truck, or a grader or a wheel loader for leveling a ground.

The working vehicle 1 includes a vehicle body frame 2, a cab 3, a vessel 4, front wheels 5, and rear wheels 6. Further, the working vehicle 1 includes a working vehicle periphery monitoring system (hereinafter, appropriately referred to as the periphery monitoring system) which monitors the periphery of the working vehicle 1 and displays the result. The periphery monitoring system will be described later in detail.

In the embodiment, the working vehicle 1 drives an electric motor by the power generated when an internal combustion engine such as a diesel engine drives a generator, so that the rear wheels 6 are driven. In this way, the working vehicle 1 is of a so-called electric driving type, but the driving type of the working vehicle 1 is not limited thereto.

The vehicle body frame 2 supports a power generating mechanism such as an internal combustion engine and a generator and an auxiliary machine thereof. The front portion of the vehicle body frame 2 supports the left and right front wheels 5 (in FIG. 1, only the right front wheel is illustrated). The rear portion of the vehicle body frame 2 supports the left and right rear wheels 6 (in FIG. 1, only the right rear wheel is illustrated). The vehicle body frame 2 includes a lower deck 2a and an upper deck 2b. The lower deck 2a is attached to the lower portion of the front surface of the vehicle body frame 2. The upper deck 2b is disposed above the lower deck 2a. A movable ladder 2c is disposed below the lower deck 2a. An inclined ladder 2d is disposed between the lower deck 2a and the upper deck 2b. A palisade guardrail 2e is disposed on the upper deck 2b.

The cab (operating room) 3 is disposed on the upper deck 2b. The cab 3 is disposed on the upper deck 2b so as to be shifted to one side in the vehicle width direction in relation to the center in the vehicle width direction. Specifically, the cab 3 is disposed on the upper deck 2b so as to be shifted to the left side in relation to the center in the vehicle width direction. The cab 3 includes therein an operation member such as a driver seat, a handle, a shift lever, an accelerator pedal, and a brake pedal.

The vessel 4 is a container which loads freight such as crushed stones thereon. The rear portion of the bottom surface of the vessel 4 is rotatably connected to the rear portion of the vehicle body frame 2 through a rotary pin. The vessel 4 may take a loading posture and a standing posture by an actuator such as a hydraulic cylinder. As illustrated in FIG. 1, the loading posture indicates a posture in which the front portion of the vessel 4 is positioned at the upper portion of the cab 3. The standing posture indicates a posture in which the freight is discharged and the vessel 4 is inclined rearward and downward. When the front portion of the vessel 4 rotates upward, the vessel 4 changes from the loading posture to the standing posture.

<Image Capturing Device of Periphery Monitoring System>

Figure 2:
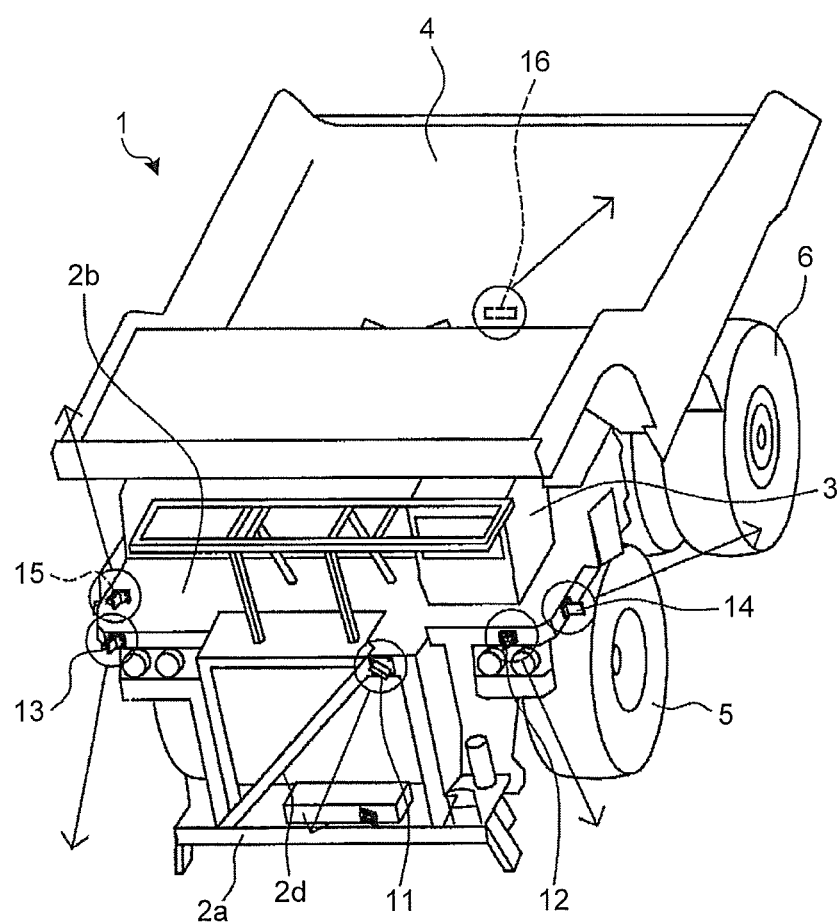
FIG. 2 is a perspective view of the working vehicle 1 equipped with an image capturing device included in a periphery monitoring system according to the embodiment.
Figure 3:
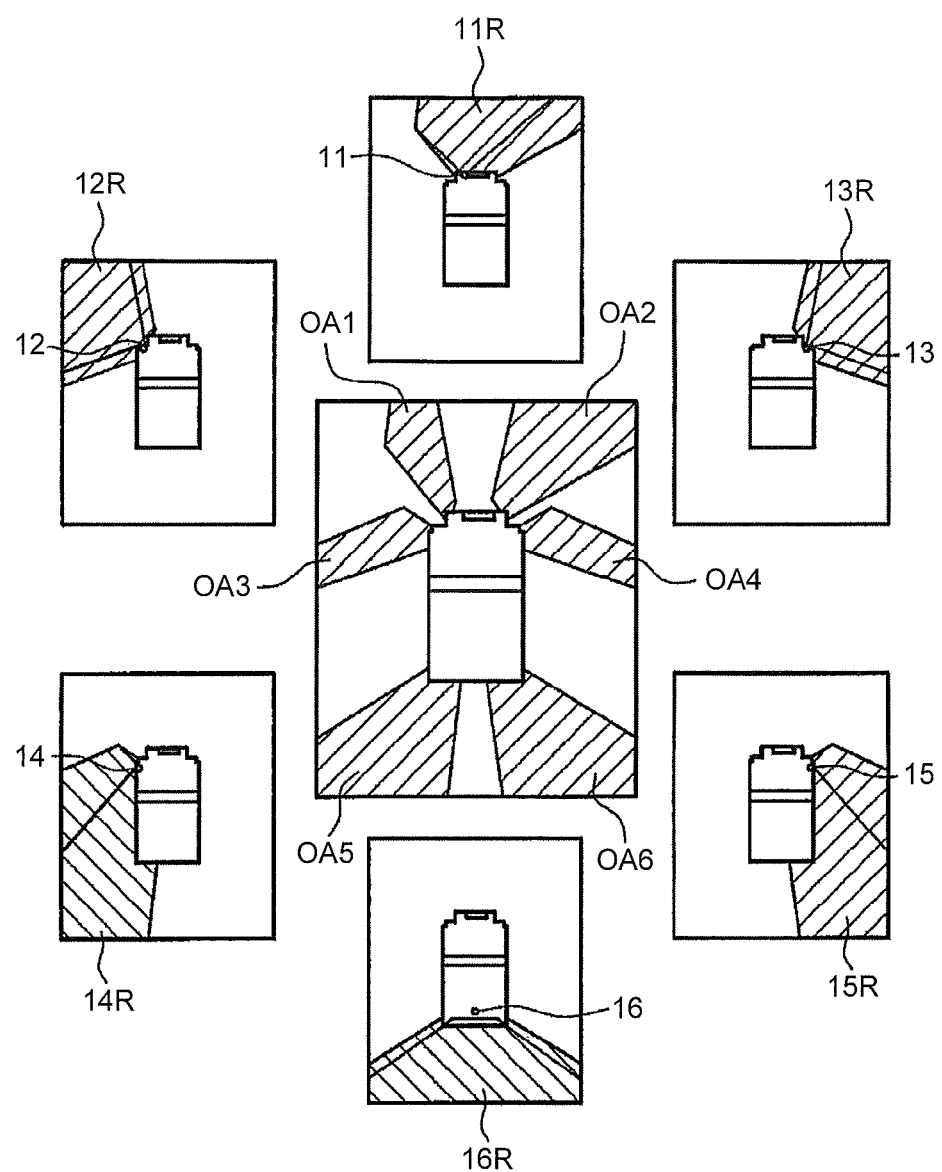
FIG. 3 is a diagram illustrating an attachment position and an image capturing range of the image capturing device.

FIG. 2 is a perspective view of the working vehicle 1 equipped with image capturing devices 11, 12, 13, 14, 15, and 16 included in the periphery monitoring system according to the embodiment. FIG. 3 is a diagram illustrating attachment positions and image capturing ranges of the image capturing devices 11, 12, 13, 14, 15, and 16. The image capturing devices 11, 12, 13, 14, 15, and 16 which are included in the periphery monitoring system according to the embodiment are attached to the working vehicle 1. The image capturing devices 11, 12, 13, 14, 15, and 16 are, for example, CCD (Charge Coupled Device) cameras, and capture the periphery of the working vehicle 1 and output the result as image information. The image capturing devices 11, 12, 13, 14, 15, and 16 are not limited to the CCD cameras. In the description below, the image capturing device 11 is appropriately referred to as the first image capturing device 11, the image capturing device 12 is appropriately referred to as the second image capturing device 12, the image capturing device 13 is appropriately referred to as the third image capturing device 13, the image capturing device 14 is appropriately referred to as the fourth image capturing device 14, the image capturing device 15 is appropriately referred to as the fifth image capturing device 15, and the image capturing device 16 is appropriately referred to as the sixth image capturing device 16. Further, when there is no need to distinguish these image capturing devices, these image capturing devices are appropriately referred to as the image capturing devices 11 to 16.

As illustrated in FIG. 2, the first image capturing device 11 is attached to the front surface of the working vehicle 1. Specifically, the first image capturing device 11 is disposed at the upper end of the inclined ladder 2d. As illustrated in FIG. 3, the first image capturing device 11 captures a first area 11R in the periphery of the working vehicle 1 and outputs first image information as image information. The first area 11R is positioned at the front side of the working vehicle 1.

As illustrated in FIG. 2, the second image capturing device 12 is attached to one side portion in the front surface of the working vehicle 1. Specifically, the second image capturing device 12 is disposed at the left side portion of the front surface of the upper deck 2b. As illustrated in FIG. 3, the second image capturing device 12 captures a second area 12R in the periphery of the working vehicle 1 and outputs second image information as image information. The second area 12R is positioned at the diagonally forward left side of the working vehicle 1.

As illustrated in FIG. 2, the third image capturing device 13 is attached to the other side portion of the front surface of the working vehicle 1. Specifically, the third image capturing device 13 is disposed at the right side portion of the front surface of the upper deck 2b. Then, the third image capturing device 13 is disposed so as to be bilaterally symmetric to the second image capturing device 12 about the axis passing the center of the working vehicle 1 in the width direction. As illustrated in FIG. 3, the third image capturing device 13 captures a third area 13R in the periphery of the working vehicle 1 and outputs third image information as image information. The third area 13R is positioned at the diagonally forward right side of the working vehicle 1.

As illustrated in FIG. 2, the fourth image capturing device 14 is attached to one side surface of the working vehicle 1. Specifically, the fourth image capturing device 14 is disposed at the front portion of the left side surface of the upper deck 2b. As illustrated in FIG. 3, the fourth image capturing device 14 captures a fourth area 14R in the periphery of the working vehicle 1 and outputs fourth image information as image information. The fourth area 14R is positioned at the diagonally backward left side of the working vehicle 1.

As illustrated in FIG. 2, the fifth image capturing device 15 is attached to the other side surface of the working vehicle 1. Specifically, the fifth image capturing device 15 is disposed at the front portion of the right side surface of the upper deck 2b. Then, the fifth image capturing device 15 is disposed so as to be bilaterally symmetric to the fourth image capturing device 14 about the axis passing the center of the working vehicle 1 in the width direction. As illustrated in FIG. 3, the fifth image capturing device 15 captures a fifth area 15R in the periphery of the working vehicle 1 and outputs fifth image information as image information. The fifth area 15R is positioned at the diagonally backward right side of the working vehicle 1.

As illustrated in FIG. 2, the sixth image capturing device 16 is attached to the rear portion of the working vehicle 1. Specifically, the sixth image capturing device 16 is disposed near a rotary shaft of the vessel 4 above an axle housing connecting two rear wheels 6 and 6 to each other. As illustrated in FIG. 3, the sixth image capturing device 16 captures a sixth area 16R in the periphery of the working vehicle 1 and outputs sixth image information as image information. The sixth area 16R is positioned at the rear side of the working vehicle 1.

By using six image capturing devices 11 to 16, the periphery monitoring system according to the embodiment may capture an image of the substantially entire periphery of the working vehicle 1 as illustrated in the middle of FIG. 3 and acquire the image information. As illustrated in FIG. 3, two adjacent areas in the first area 11R to the sixth area 16R partially overlap each other. Specifically, the first area 11R partially overlaps the second area 12R in a first overlapping area OA1. Further, the first area 11R partially overlaps the third area 13R in a second overlapping area OA2.

The second area 12R partially overlaps the fourth area 14R in a third overlapping area OA3. The third area 13R partially overlaps the fifth area 15R in a fourth overlapping area OA4. The fourth area 14R partially overlaps the sixth area 16R in a fifth overlapping area OA5. The fifth area 15R partially overlaps the sixth area 16R in a sixth overlapping area OA6. Next, the periphery monitoring system according to the embodiment will be described in detail.

<Periphery Monitoring System>

Figure 4:
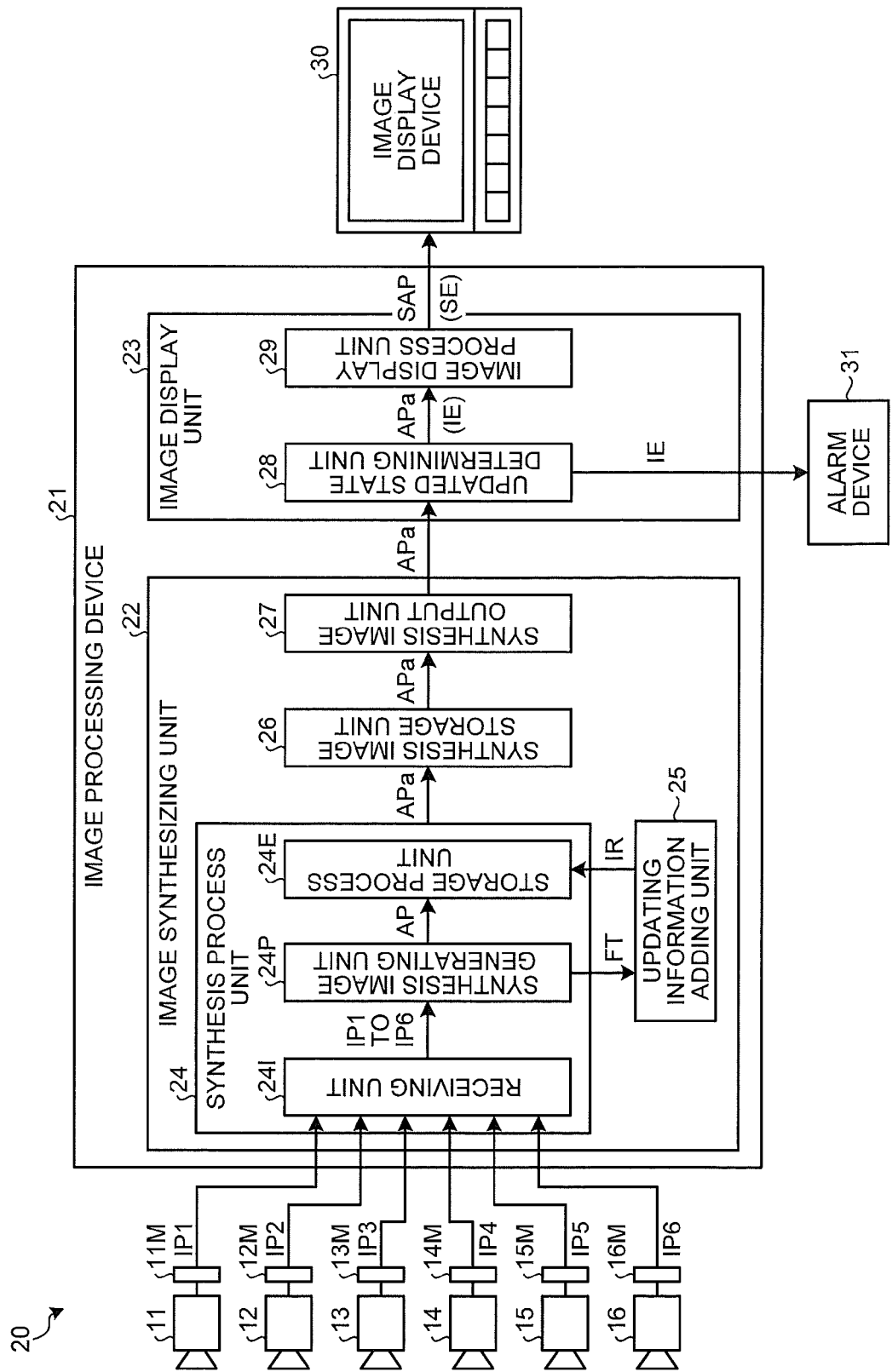
FIG. 4 is a functional block diagram of a periphery monitoring system 20 according to the embodiment.

FIG. 4 is a functional block diagram of a periphery monitoring system 20 according to the embodiment. The periphery monitoring system 20 includes the image capturing devices 11 to 16 and an image processing device 21. The image processing device 21 is connected with the image capturing devices 11 to 16 and an image display device 30. The image display device 30 is disposed inside the cab 3 of the working vehicle 1 illustrated in FIGS. 1 and 2. More specifically, the image display device 30 is disposed at a position where the operator of the working vehicle 1 may easily see the image display device and the operator's viewing angle is not disturbed during a running operation when the operator operates the working vehicle 1 inside the cab 3. The image processing device 21 synthesizes the first image information IP1 to the sixth image information IP6 in the periphery of the working vehicle 1 captured by the image capturing devices 11 to 16, generates synthesis image information, and displays an overhead image in the periphery of the working vehicle 1 on the image display device 30.

The image processing device 21 includes an image synthesizing unit 22 and an image display unit 23. The image synthesizing unit 22 executes an image process in which updated synthesis image information APa is generated by adding the updating information IR to the synthesis image information AP obtained by synthesizing the first image information IP1 to the sixth image information IP6 acquired from the image capturing devices 11 to 16. The image synthesizing unit 22 is, for example, an image processing device (for example, an image board) equipped with an exclusive IC (for example, FPGA: Field-Programmable Gate Array) executing the image process, a memory (for example, VRAM: Video Random Access Memory), and the like. The image display unit 23 acquires the updated synthesis image information APa output from the image synthesizing unit 22 and executes a process in which the updated state of the updated synthesis image information APa is detected and the updated synthesis image information APa is displayed on the image display device 30. The image display unit 23 is a calculation device (for example, CPU: Central Processing Unit) which executes the process.

The image synthesizing unit 22 includes a synthesis process unit 24, an updating information adding unit 25, a synthesis image storage unit 26, and a synthesis image output unit 27. The synthesis process unit 24 includes a receiving unit 24I, a synthesis image generating unit 24P, and a storage process unit 24E. The image display unit 23 includes an updated state determining unit 28 and an image display process unit 29.

The receiving unit 24I of the synthesis process unit 24 receives the first image information IP1 to the sixth image information IP6 from the plurality of image capturing devices 11 to 16. In the embodiment, frame memories 11M, 12M, 13M, 14M, 15M, and 16M (appropriately referred to as 11M to 16M) are connected between the image capturing devices 11 to 16 and the receiving unit 24I. The first image information IP1 to the sixth image information IP6 which are output from the image capturing devices 11 to 16 are temporarily stored in the frame memories 11M to 16M. The receiving unit 24I receives the first image information IP1 to the sixth image information 1P6 from the frame memories 11M to 16M.

The synthesis image generating unit 24P of the synthesis process unit 24 acquires the first image information IP1 to the sixth image information IP6 received by the receiving unit 24I from the receiving unit 24I. Then, the synthesis image generating unit 24P synthesizes the first image information IP1 to the sixth image information IP6 so as to generate the synthesis image information AP. As described above, the synthesis image information AP is information for displaying the overhead image in the periphery of the working vehicle 1 on the image display device 30. Next, the overhead image will be described.

Figure 5:
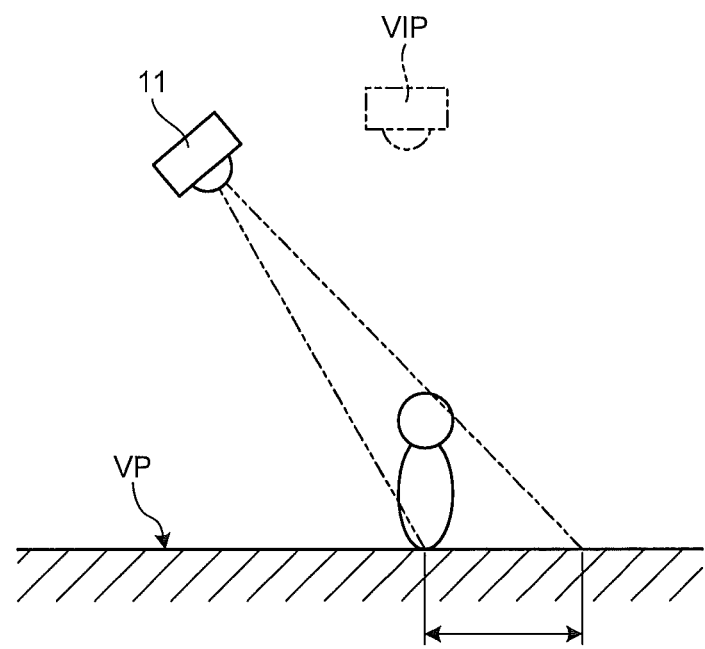
FIG. 5 is a diagram illustrating an image converting method using a virtual projection plane VP.

FIG. 5 is a diagram illustrating an image converting method using the virtual projection plane VP. The synthesis image generating unit 24P generates the overhead image in the periphery of the working vehicle 1 based on the plurality of images indicated by the first image information IP1 to the sixth image information IP6. Specifically, the synthesis image generating unit 24P executes the coordinate conversion of the first image information IP1 to the sixth image information IP6 by using predetermined conversion information. The conversion information is information representing the correlation between the position coordinate of each pixel of the input image and the position coordinate of each pixel of the output image. In the embodiment, the input image is an image captured by each of the image capturing devices 11 to 16, and is an image corresponding to the first image information IP1 to the sixth image information IP6. The output image is the overhead image displayed on the image display device 30.

The synthesis image generating unit 24P converts the images captured by the image capturing devices 11 to 16 into the image seen from a predetermined virtual viewing point positioned above the working vehicle 1 by using the conversion information. Specifically, as illustrated in FIG. 5, the images captured by the image capturing devices 11 to 16 are projected onto the predetermined virtual projection plane VP, so that the images are converted into the image seen from the virtual viewing point VIP positioned above the working vehicle 1. The conversion information indicates the virtual projection plane VP. The converted image is the overhead image which is displayed on the image display device 30. The synthesis image generating unit 24P generates the overhead image in the periphery of the working vehicle 1 by the synthesis through the projection of the first image information IP1 to the sixth image information IP6 acquired from the plurality of image capturing devices 11 to 16 onto the predetermined virtual projection plane VP.

As described above, the areas in the periphery of the working vehicle 1 captured by the respective image capturing devices 11 to 16 overlap each other in the first overlapping area OA1 to the sixth overlapping area OA6. The synthesis image generating unit 24P displays the images corresponding to the first image information IP1 to the sixth image information IP6 from the image capturing devices 11 to 16 so that two adjacent images in the first overlapping area OA1 to the sixth overlapping area OA6 overlap each other in the overhead image.

Specifically, the synthesis image generating unit 24P displays an image in the first overlapping area OA1 so that the image of the first image information IP1 from the first image capturing device 11 overlaps the image of the second image information IP2 from the second image capturing device 12. Further, the synthesis image generating unit 24P displays an image in the second overlapping area OA2 so that the image of the first image information IP1 from the first image capturing device 11 overlaps the image of the third image information IP3 from the third image capturing device 13. Further, the synthesis image generating unit 24P displays an image in the third overlapping area OA3 so that the image of the second image information IP2 from the second image capturing device 12 overlaps the image of the fourth image information IP4 from the fourth image capturing device 14. Further, the synthesis image generating unit 24P displays an image in the fourth overlapping area OA4 so that the image of the third image information IP3 from the third image capturing device 13 overlaps the image of the fifth image information IP5 from the fifth image capturing device 15. Further, the synthesis image generating unit 24P displays an image in the fifth overlapping area OA5 so that the image of the fourth image information IP4 from the fourth image capturing device 14 overlaps the image of the sixth image information IP6 from the sixth image capturing device 16. Further, the synthesis image generating unit 24P displays an image in the sixth overlapping area OA6 so that the image of the fifth image information IP5 from the fifth image capturing device 15 overlaps the image of the sixth image information IP6 from the sixth image capturing device 16.

In this way, when two pieces of the image information are synthesized in an overlapping manner in the first overlapping area OA1 to the sixth overlapping area OA6, a value obtained by multiplying the synthesis ratio is added to the values of the first image information IP1 to the sixth image information IP6. The synthesis ratio is a value corresponding to each of the first image information IP1 to the sixth image information IP6, and is stored in the synthesis image generating unit 24P. For example, the synthesis ratio is determined for each of the first image information IP1 to the sixth image information IP6 such that the synthesis ratio of the first image information IP1 is 0.5, the synthesis ratio of the second image information IP2 is 0.5, and the like. By using the synthesis ratio, the plurality of image information are averaged in the first overlapping area OA1 to the sixth overlapping area OA6. As a result, an abrupt change in color and contrast is suppressed, and hence a natural overhead image may be generated. The synthesis image generating unit 24P generates the synthesis image information AP representing the overhead image synthesized as described above and outputs the synthesis image information to the storage process unit 24E of the synthesis process unit 24.

The synthesis image generating unit 24P sequentially acquires the first image information IP1 to the sixth image information IP6 from the receiving unit 24I, and synthesizes the first image information IP1 to the sixth image information IP6 in an acquired order so as to generate the synthesis image information AP. The updating information adding unit 25 adds an item which is newly generated by the synthesis process unit 24, that is, the updating information IR representing a state where the generated synthesis image information AP is updated to the different information to the synthesis image information AP generated by the synthesis process unit 24. The synthesis image information AP to which the updating information IR is added is generated by the synthesis process unit 24 at the timing different from that of the other synthesis image information AP. The updating information IR may use the information of repeating the number using the value equal to or larger than the number of the synthesis image information AP can be stored in the synthesis image storage unit 26, the sequence information of counting the sequential number (serial number) of the synthesis image information AP, the time stamp of the process time of the image synthesis process using the synthesis process unit 24, or the combination thereof.

Here, the information of repeating the number becomes four when the number of the synthesis image information AP which can be stored in the storage unit 26 is, for example, three. The number of the updating information IR is used in the cyclic of 1, 2, 3, 4, 1, 2, 3, 4, 1, 2, 3, 4, . . . . Each piece of information necessary for performing the time stamp may be generated by using, for example, the clock used in the operation of the CPU included in the image processing device 21.

For example, when the time stamp of the process time of the image synthesis process using the synthesis process unit 24 is used, the synthesis image generating unit 24P outputs the synthesis image information AP to the storage process unit 24E at the timing at which the first image information IP1 to the sixth image information IP6 are synthesized so as to generate the synthesis image information AP and outputs the end signal FT of the synthesis process to the updating information adding unit 25. The end signal FT of the synthesis process is a signal which represents the end of the generation of the synthesis image information AP. The updating information adding unit 25 adds each time stamp when receiving the end signal FT as the updating information IR to the synthesis image information AP of the storage process unit 24E. When the synthesis image generating unit 24P may not generate the synthesis image information AP, the synthesis image generating unit 24P does not output the end signal FT. In this case, the updating information adding unit 25 does not add the updating information IR. In this way, the updating information adding unit 25 determines whether to add the updating information IR based on the end signal FT of the synthesis process.

The synthesis image information AP to which the updating information IR is added, that is, the updated synthesis image information APa is output from the storage process unit 24E to the synthesis image storage unit 26. The synthesis image storage unit 26 stores the updated synthesis image information APa output from the storage process unit 24E of the synthesis process unit 24. That is, the synthesis image storage unit 26 sequentially stores the updated synthesis image information APa in which the updating information adding unit 25 adds the updating information IR to the synthesis image information AP generated by the synthesis process unit 24. The synthesis image output unit 27 reads out the updated synthesis image information APa from the synthesis image storage unit 26 in a stored order, and sequentially outputs the updated synthesis image information to the updated state determining unit 28 of the image display unit 23. When the updated synthesis image information APa is read out, the synthesis image storage unit 26 stores new updated synthesis image information APa from the synthesis process unit 24 in the area. When the synthesis process unit 24 may not generate the synthesis image information AP, the updated synthesis image information APa which is stored in the synthesis image storage unit 26 is not updated.

The updated state determining unit 28 of the image display unit 23 acquires the synthesis image information AP to which the updating information IR is added, that is, the updated synthesis image information APa through the synthesis image storage unit 26, and more specifically, the synthesis image output unit 27, and detects that the synthesis image information AP is updated based on the updating information IR. For example, the updated state determining unit 28 compares the updating information IR included in the updated synthesis image information APa acquired at the current time with the updating information IR included in the updated synthesis image information APa acquired at the precedent time. As a result, when both updating information are different from each other, the synthesis image information AP included in the updated synthesis image information APa acquired at the current time is updated from the synthesis image information AP included in the updated synthesis image information APa acquired at the precedent time. That is, the updated state determining unit 28 detects that the synthesis image information AP from the image synthesizing unit 22 is updated. When both updating information are equal to each other as the above-described comparison result, it is determined that the synthesis image information AP included in the updated synthesis image information APa acquired at the current time is not updated from the synthesis image information AP included in the updated synthesis image information APa acquired at the precedent time. That is, the updated state determining unit 28 detects that the synthesis image information AP from the image synthesizing unit 22 is not updated.

The image display process unit 29 of the image display unit 23 displays an image based on the synthesis image information AP stored in the synthesis image storage unit 26, and more specifically, the synthesis image information AP included in the updated synthesis image information APa, that is, the overhead image on the image display device 30. When at least one of the image capturing devices 11 to 16 does not output the image information, the synthesis process unit 24 generates the synthesis image information AP by using the output image information. The overhead image which is displayed on the image display device 30 by the image display process unit 29 based on the synthesis image information AP becomes an image in which a part of the area in the periphery of the working vehicle 1 is removed.

Here, the process of the image display process unit 29 when the synthesis image information AP stored in the synthesis image storage unit 26 is not updated will be described. In this case, the image display process unit 29 repeatedly displays the overhead image based on the synthesis image information AP which is not updated on the image display device 30.

In the embodiment, the updated state determining unit 28 generates information (abnormality occurrence information) IE representing the abnormality when the updating of the synthesis image information AP is not detected. For example, the updated state determining unit 28 displays an information representing the state where the overhead image currently displayed on the image display device 30 is not updated and is different from the image actually seen from the image capturing devices 11 to 16 as the abnormality occurrence information IE on the image display device 30. Further, the updated state determining unit 28 notifies the abnormality occurrence information IE to an alarm device 31. The alarm device 31 is disposed inside the cab (operating room) 3 as illustrated in FIG. 1. As the alarm device 31, for example, a speaker, a lamp, or the like may be used. When the speaker is used, the alarm device 31 notifies the abnormality occurrence information IE in terms of a sound. When the lamp is used, the alarm device 31 notifies the abnormality occurrence information IE by flickering light, turning on light, or turning on light in a different color. In the alarm device 31 (for example, the lamp), the image display device 30 which is disposed inside the cab 3 may be provided in the attachment panel.

With such a configuration, when the synthesis image information AP is not updated by any problem occurring in the image processing device 21, the operator of the working vehicle 1 may obtain information in which the overhead image currently displayed on the image display device 30 is not updated and is different from the image actually seen from the image capturing devices 11 to 16. As a result, it is possible to improve the safety when the periphery monitoring system 20 assists the running operation.

Further, when the updated state determining unit 28 does not detect the updating of the synthesis image information AP, the display of the overhead image on the image display device 30, that is, the display of the image based on the synthesis image information AP stored in the synthesis image storage unit 26 as the notification of the abnormality occurrence information IE may be stopped. In this case, the operator may recognize the occurrence of the abnormality depending on the fact that the overhead image to be displayed on the image display device 30 is not displayed. Even in this way, it is possible to improve the safety when the periphery monitoring system 20 assists the running operation. In a case where a process is executed in which the overhead image is not displayed on the image display device 30 when the synthesis image information AP is not updated, the display of the overhead image on the image display device 30 may be stopped and the occurrence of the problem as the abnormality occurrence information IE may be notified while being displayed on the image display device 30. In this way, the operator may further reliably recognize the occurrence of the abnormality. Next, the process sequence of the periphery monitoring system 20 will be described.

<Process Sequence of Periphery Monitoring System>

Figure 9:
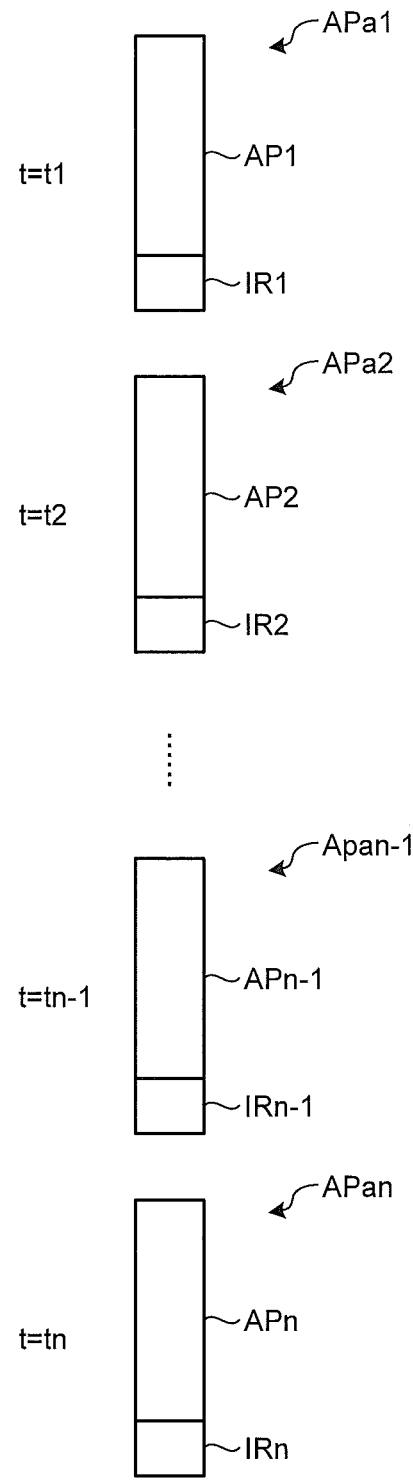
FIG. 9 is a conceptual diagram illustrating a state where synthesis image information AP1 to APn are updated.

FIG. 6 is a flowchart illustrating a process sequence of the image synthesizing unit 22. FIG. 7 is a conceptual diagram of the updated synthesis image information APa. FIG. 8 is a flowchart illustrating a process sequence of the image display unit 23. FIG. 9 is a conceptual diagram illustrating the updating of the synthesis image information AP1 to APn. First, the process sequence of the image synthesizing unit 22 will be described. In step S101, the image synthesizing unit 22 acquires the first image information IP1 to the sixth image information IP6 from the image capturing devices 11 to 16.

The routine proceeds to step S102, and the synthesis image generating unit 24P of the image synthesizing unit 22 generates the synthesis image information AP from the first image information IP1 to the sixth image information IP6. When the synthesis image generating unit 24P generates the synthesis image information AP, the end signal FT is output to the updating information adding unit 25, and the generated synthesis image information AP is output to the storage process unit 24E of the synthesis process unit 24.

In step S103, the updating information adding unit 25 which receives the end signal FT generates the updating information IR which is added to the synthesis image information AP generated by the synthesis image generating unit 24P. Then, in step S104, the updating information adding unit 25 adds the generated updating information IR to the synthesis image information AP which is generated by the synthesis image generating unit 24P and is output to the storage process unit 24E of the synthesis process unit 24. In step S105, the synthesis image storage unit 26 stores the synthesis image information AP to which the updating information IR is added, that is, the updated synthesis image information APa. For example, as illustrated in FIG. 7, the updated synthesis image information APa is obtained by adding the updating information IR to the end of the synthesis image information AP. Next, in step S106, the synthesis image output unit 27 acquires the updated synthesis image information APa from the synthesis image storage unit 26, and outputs the updated synthesis image information to the updated state determining unit 28 of the image display unit 23.

Next, the process sequence of the image display unit 23 will be described. In step S201, the updated state determining unit 28 acquires the updated synthesis image information APa from the image synthesizing unit 22, and more specifically, the synthesis image output unit 27. Next, in step S202, the updated state determining unit 28 extracts the updating information IR from the acquired updated synthesis image information APa. Next, the routine proceeds to step S203, and the updated state determining unit 28 determines whether the synthesis image information AP is updated. In the example illustrated in FIG. 9, when detecting the state where the updated synthesis image information APa2 is updated at the current time (for example, the time t=t2), the updated state determining unit 28 compares the updating information IR2 included in the current updated synthesis image information APa2 with the updating information IR1 included in the updated synthesis image information APa1 at the precedent time (the time t=t1 and t1<t2). Then, when IR1 is different from IR2 (specifically, IR2>IR1), the updated state determining unit 28 detects that the synthesis image information AP2 included in the updated synthesis image information APa2 is updated from the synthesis image information AP1 included in the updated synthesis image information APa1 (Yes in step S203).

When the updated synthesis image information APan at the time t=tn is the current updating information synthesis image information, the updated state determining unit 28 compares the updated synthesis image information APan with the updated synthesis image information APan-1 at the precedent time (the time t=tn−1 and tn−1<tn) (n is an integer equal to or larger than 1). In this way, when detecting whether the updated synthesis image information APan is updated, the updated state determining unit 28 compares the updating information IRn-1 of the updated synthesis image information APan-1 generated at the precedent time, that is, the time just before the current time with the updating information IRn of the updated synthesis image information APan at the current time.

When the synthesis image information AP included in the current updated synthesis image information APa is updated from the precedent synthesis image information AP (Yes in step S203), the routine proceeds to step S204, and the image display process unit 29 generates the image signal SAP from the synthesis image information AP included in the updated synthesis image information APa. Then, the routine proceeds to step S205, and the image display process unit 29 displays an image based on the generated image signal SAP on the image display device 30. The image based on the image signal SAP becomes the overhead image.

In step S203, when the synthesis image information AP included in the current updated synthesis image information APa is not updated from the synthesis image information included in the precedent updated synthesis image information (No in step S203), the routine proceeds to step S206, and the updated state determining unit 28 executes the abnormality occurrence process. The abnormality occurrence process is a process in which the updated state determining unit 28 generates the abnormality occurrence information IE. In this example, the updated state determining unit 28 generates the abnormality occurrence information IE and outputs the abnormality occurrence information to the image display process unit 29. In step S207, the image display process unit 29 which acquires the abnormality occurrence information IE generates the image information SE including the abnormality occurrence information IE. Then, the routine proceeds to step S205, and the image display process unit 29 displays an image based on the generated image information SE on the image display device 30. The image based on the image information SE, for example, the image currently displayed on the image display device 30 as described above is an image which includes information which represents that the image is different from the image actually seen from the image capturing devices 11 to 16.

In step S203, when the updated state determining unit 28 detects once that the synthesis image information AP is not updated, the abnormality occurrence process is executed and the abnormality occurrence information EP is generated and notified. However, the determination on whether the abnormality occurrence information EP is generated is not limited thereto. For example, when the number of times in which the updating of the synthesis image information AP is not detected is equal to or larger than a predetermined number of times, the updated state determining unit 28 may generate and notify the abnormality occurrence information EP.

There is a case in which the updating information adding unit 25 may not acquire the end signal FT due to noise or the like or may not add the updating information IR and the updated state determining unit 28 may not detect the updating of the synthesis image information AP due to the influence of noise or the like. In this case, even when the synthesis image information AP is updated, the updated state determining unit 28 may not detect the updating of the synthesis image information AP and may generate and notify the abnormality occurrence information EP. When the number of times in which the updating of the synthesis image information AP is not detected is equal to or larger than a predetermined number of times, the abnormality occurrence information EP is generated and notified, and hence the updated state determining unit 28 may further reliably detect whether the synthesis image information AP is updated. Then, the periphery monitoring system 20 may further reliably notify the occurrence of the abnormality to the operator.

As described above, in the embodiment, it is possible to detect whether the synthesis image information AP is updated based on the updating information IR added to the synthesis image information AP. With such a configuration, when the synthesis image information AP is not updated, it is possible to detect any problem occurring in the image processing device 21 as the fact that any problem occurs in the image processing device 21. Further, in the embodiment, when the synthesis image information AP is not updated, information representing the abnormality is notified as the fact that any problem occurs in the image processing device 21. With such a configuration, the operator of the working vehicle 1 may recognize the fact that an abnormality occurs in the overhead image currently displayed on the image display device 30 by the information representing the notified abnormality. As a result, it is possible to improve the safety when the periphery monitoring system 20 assists the running operation. In the embodiment, the invention is particularly appropriate for the superjumbo working vehicle used in a mine.

Further, in the embodiment, the updating information IR is added to the synthesis image information AP generated from the first image information IP1 to the sixth image information IP6. For this reason, compared to the case where the updating information IR is added to each of the first image information IP1 to the sixth image information IP6, it is possible to reduce the process load on the application of the updating information IR and to reduce the capacity of the memory storing the first image information IP1 to the sixth image information IP6 to which the updating information IR is added.

Further, in the embodiment, the updated synthesis image information APa in which the updating information IR is added to the synthesis image information AP is stored in the synthesis image storage unit 26. For this reason, it is possible to specify the problem occurring timing or the problem occurring position by analyzing the updating information IR and the like of the updated synthesis image information APa stored in the synthesis image storage unit 26 later. For example, when the synthesis image information AP of the updated synthesis image information APa stored in the synthesis image storage unit 26 is not updated, it is possible to specify the problem which occurs in the image capturing devices 11 to 16 in relation to the synthesis image storage unit 26. Further, when the image is not displayed on the image display device 30, if the synthesis image information AP of the updated synthesis image information APa stored in the synthesis image storage unit 26 is updated, it is possible to specify the problem occurring in the image display device 30 in relation to the synthesis image storage unit 26. In this way, in the embodiment, it is possible to further easily specify the problem occurring position depending on whether the synthesis image information AP is updated.

In the embodiment, since the updated synthesis image information APa in which the updating information IR is added to the synthesis image information AP is output to the image display unit 23 while being sequentially stored in the synthesis image storage unit 26, the synthesis image storage unit 26 stores the updated synthesis image information APa stored for a predetermined time in time series. For this reason, when the synthesis image information AP is updated or is not updated, the updated synthesis image information APa stored in the synthesis image storage unit 26 in time series is analyzed later, and hence it is possible to find out the timing at which the problem occurs. In this way, in the embodiment, there is an advantage that the problem occurring in the image processing device 21 is easily specified.

The constituents that are described above include a constituent that is easily supposed by the person skilled in the art, a constituent that has substantially the same configuration, and a constituent that is included in a so-called equivalent scope. Further, the above-described constituents may be appropriately combined with each other. Furthermore, the constituents may be omitted, replaced, or modified in various forms in the scope without departing from the spirit of the embodiment.

REFERENCE SIGNS LIST

1 working vehicle
11 first image capturing device (image capturing device)
11M, 12M, 13M, 14M, 15M, 16M frame memory
12 second image capturing device (image capturing device)
13 third image capturing device (image capturing device)

14 fourth image capturing device (image capturing device)
15 fifth image capturing device (image capturing device)
16 sixth image capturing device (image capturing device)
20 working vehicle periphery monitoring system (periphery monitoring system)
21 image processing device
22 image synthesizing unit
23 image display unit
24 synthesis process unit
24E storage process unit
24I receiving unit
24P synthesis image generating unit
25 updating information adding unit
26 synthesis image storage unit
27 synthesis image output unit
28 updated state determining unit
29 image display process unit
30 image display device
31 alarm device
AP, AP1, AP2 synthesis image information
AP1 synthesis image information
APa, APa1, APa2, APan-1, APan updated synthesis image information
EP abnormality occurrence information
FT end signal
IE abnormality occurrence information
IR, IR1, IR2, IRn-1, IRn updating information
SAP image signal
SE image information
VIP virtual viewing point
VP virtual projection plane

The invention claimed is:

1. A working vehicle periphery monitoring system comprising:
a plurality of image capturing devices that are attached to a working vehicle and capture a periphery of the working vehicle to output image information;
a synthesis process unit that acquires the image information output from the plurality of image capturing devices and synthesizes the acquired image information to generate synthesis image information;
an updating information adding unit that adds updating information representing that the synthesis image information is newly generated by the synthesis process unit to the synthesis image information generated by the synthesis process unit;
a synthesis image storage unit that stores the synthesis image information to which the updating information is added;
an image display process unit that displays an image based on the synthesis image information stored in the synthesis image storage unit on an image display device; and
an updated state determining unit that acquires the synthesis image information to which the updating information is added from the synthesis image storage unit and detects that the synthesis image information is updated based on the updating information,
wherein the updated state determining unit notifies information representing an abnormality when the updated state determining unit detects that the updating information included in the synthesis image information acquired at the current time and the updating information included in the synthesis image information acquired before the current time are equal to each other,
wherein the updated state determining unit determines that the synthesis image information is updated when the updated state determining unit detects that the updating information included in the synthesis image information acquired at the current time and the updating information included in the synthesis image information acquired before the current time are different from each other,
wherein the image display process unit generates an image signal from the synthesis image information included in the updated synthesis image information when the updated state determining unit determines that the synthesis image information is updated, and
wherein the image display process unit displays an image based on the generated image signal on the image display device.

2. The working vehicle periphery monitoring system according to claim 1,
wherein the synthesis process unit synthesizes the acquired image information to generate the synthesis image information and outputs a synthesis process end signal to the updating information adding unit.

3. The working vehicle periphery monitoring system according to claim 2,
wherein the updating information adding unit determines whether to add the updating information based on the synthesis process end signal.

4. The working vehicle periphery monitoring system according to claim 1, wherein the updated state determining unit notifies the information representing the abnormality to the image display device.

5. The working vehicle periphery monitoring system according to claim 4,
wherein the updated state determining unit stops the display of the image based on the synthesis image information stored in the synthesis image storage unit.

6. The working vehicle periphery monitoring system according to claim 1, wherein, when the information representing the abnormality is notified, the display of the image on the image display device is stopped.

7. The working vehicle periphery monitoring system according to claim 1, wherein the updated state determining unit notifies the information representing the abnormality when the number of times in which the updating of the synthesis image information is not detected is equal to or larger than a predetermined number of times.

8. A working vehicle comprising
the working vehicle periphery monitoring system according to claim 1.

9. The working vehicle periphery monitoring system according claim 1, wherein the updated state determining unit detects that the synthesis image information is not updated by comparing the updating information included in the synthesis image information acquired at a current time with the updating information included in the synthesis image information acquired at a precedent time.

10. The working vehicle periphery monitoring system according claim 1, wherein the updating information includes at least one of:
a value equal to or larger than the number of the synthesis image information;
a serial number corresponding to a sequence information of counting the sequential number of the synthesis image information; and
a time stamp of a process time of the acquired image synthesis created by the synthesis process unit.

11. A working vehicle periphery monitoring system comprising:
- a plurality of image capturing devices that are attached to a working vehicle and capture a periphery of the working vehicle to output image information;
- a synthesis process unit that acquires the image information output from the plurality of image capturing devices and synthesizes the acquired image information to generate synthesis image information;
- an updating information adding unit that adds updating information representing that the synthesis image information is newly generated by the synthesis process unit to the synthesis image information generated by the synthesis process unit;
- a synthesis image storage unit that stores the synthesis image information to which the updating information is added;
- an image display process unit that displays an image based on the synthesis image information stored in the synthesis image storage unit on an image display device; and
- an updated state determining unit that acquires the synthesis image information to which the updating information is added from the synthesis image storage unit, detects that the synthesis image information is updated based on the updating information, wherein the updated state determining unit notifies information representing an abnormality to the image display device when the updated state determining unit does not detect that the synthesis image information is updated, the synthesis process unit synthesizes the acquired image information to generate the synthesis image information and outputs a synthesis process end signal to the updating information adding unit, the updating information adding unit determines whether to add the updating information based on the synthesis process end signal, the updated state determining unit notifies information representing an abnormality when the updated state determining unit detects that the updating information included in the synthesis image information acquired at the current time and the updating information included in the synthesis image information acquired before the current time are equal to each other, and the updated state determining unit determines that the synthesis image information is updated when the updated state determining unit detects that the updating information included in the synthesis image information acquired at the current time and the updating information included in the synthesis image information acquired before the current time are different from each other, and the image display process unit generates an image signal from the synthesis image information included in the updated synthesis image information when the updated state determining unit determines that the synthesis image information is updated, and the image display process unit displays an image based on the generated image signal on the image display device.

12. A working vehicle comprising the working vehicle periphery monitoring system according to claim 11.

13. The working vehicle periphery monitoring system according to claim 11, wherein the updating information includes at least one of:
- a value equal to or larger than the number of the synthesis image information;
- a serial number corresponding to a sequence information of counting the sequential number of the synthesis image information; and
- a time stamp of a process time of the acquired image synthesis created by the synthesis process unit.

* * * * *